(12) United States Patent
Karri et al.

(10) Patent No.: US 9,398,545 B2
(45) Date of Patent: Jul. 19, 2016

(54) DEVICE AND METHOD FOR SETTING A TARGET POWER

(71) Applicant: APPLE INC., Cupertino, CA (US)

(72) Inventors: Sai Sravan Bharadwaj Karri, Cupertino, CA (US); Sunny Arora, Cupertino, CA (US); Arjun Bhupathi Raju, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 101 days.

(21) Appl. No.: 14/292,008

(22) Filed: May 30, 2014

(65) Prior Publication Data

US 2015/0351049 A1    Dec. 3, 2015

(51) Int. Cl.
*H04W 52/34*    (2009.01)

(52) U.S. Cl.
CPC .................................. *H04W 52/34* (2013.01)

(58) Field of Classification Search
CPC ..... H04W 24/00; H04W 28/22; H04W 24/02; H04W 28/04; H04W 74/04; H04W 88/02; H04W 88/08; H04B 7/264
See application file for complete search history.

(56) References Cited

U.S. PATENT DOCUMENTS

| | | | | |
|---|---|---|---|---|
| 8,054,836 B2 * | 11/2011 | Fischer | ................... | H04L 47/10 370/394 |
| 2002/0001292 A1 * | 1/2002 | Miyamoto | .......... | H04W 52/367 370/335 |
| 2011/0085496 A1 * | 4/2011 | Zhang | ................... | H04L 1/1848 370/328 |

* cited by examiner

*Primary Examiner* — Bobbak Safaipour
(74) *Attorney, Agent, or Firm* — Fay Kaplun & Marcin, LLP (57) ABSTRACT

A method, station and computer readable storage medium used for setting a power level of the station. The station implements a first processing layer that is a radio link control layer and a second processing layer that is a physical layer. The method includes receiving data units of a voice application, the data units being in a sequence, determining whether the first processing layer of the station detects a gap in the sequence of received data units, communicating an indication from the first processing layer to the second processing layer, the indication indicating at least one identity of corresponding missing data units in the gap relative to the first processing layer and increasing the current power level when the at least one identity of the corresponding missing data units relative to the first processing layer is also determined to be a missing data unit relative to the second processing layer.

19 Claims, 5 Drawing Sheets

Fig. 4 ized Mobile Telecommunications System (UMTS). The WCDMA standard uses a Direct Sequence-Code Division Multiple Access (DS-CDMA) channel access method utilizing a 5 MHz channel for both voice and data to achieve the transmission speeds thereof. The WCDMA standard also supports both a Frequency Division Duplex (FDD) and Time Division Duplex (TDD) method.

DEVICE AND METHOD FOR SETTING A TARGET POWER

BACKGROUND INFORMATION

A station may establish a connection to a communications network to perform a variety of different functionalities. One such functionality is a voice call in which a first station and a second station may communicate with each other via the network using voice data. A particular implementation of performing the voice call is Wideband Code Division Multiple Access (WCDMA), which is a standard, defined under 3G mobile telecommunications networks such as Universal Mobile Telecommunications System (UMTS). The WCDMA standard uses a Direct Sequence-Code Division Multiple Access (DS-CDMA) channel access method utilizing a 5 MHz channel for both voice and data to achieve the transmission speeds thereof. The WCDMA standard also supports both a Frequency Division Duplex (FDD) and Time Division Duplex (TDD) method.

When a network uses WCDMA, voice frames may be transmitted between the two stations. The voice frames may be configured for transmission using a variety of different protocols. For example, a Blind Transport Format Detection (BTFD) may be used for the voice frames. The network that utilizes the BTFD method may use Transport Formats (TF) of 0x148 and 1x148 for signaling of the voice frames. The 0x148 TF may be a 0-rate TF while the 1x148 TF may be a full-rate TF. As such, the 0x148 TF may not have Cyclic Redundancy Check (CRC) bits attached while the 1x148 TF may have the CRC bits attached. The station may receive these 0x148 and 1x148 TFs from the network to subsequently receive the voice frames. However, it may be difficult for an outer loop power control to detect an error in the CRC bits of the 1x148 TF to adjust a target power to receive subsequent signaling frames. For example, the outer loop power control may not be capable of differentiating between a missed transmission and a control transmission (e.g., a Discontinuous Reception (DRX)/Discontinuous Transmission (DTX) when the network is a Long Term Evolution (LTE) network).

Accordingly, the outer loop power control of the station may not adjust or increase the power despite more power being required to compensate for the missed transmissions. This may result in various drawbacks such as dropped voice packets during the WCDMA voice call that ultimately lead to a bad user experience. Furthermore, the outer loop power control of the station may inadvertently adjust or increase the power despite a lower power that is already in use and is fully sufficient for the transmissions. This may also result in various drawbacks such as increased power consumption, particularly when the station relies upon a portable power supply that is limited.

DETAILED DESCRIPTION

The exemplary embodiments describe a method performed by a station that includes circuitry that implements a first processing layer and a second processing layer, wherein the first processing layer is a radio link control (RLC) layer and the second processing layer is a physical layer. The method includes receiving data units of a voice application from a network at a current power level set for the station, the data units being in a sequence with a position in the sequence being indicated in each data unit, determining whether the first processing layer of the station detects a gap in the sequence of received data units, communicating an indication from the first processing layer to the second processing layer, the indication indicating at least one identity of corresponding missing data units in the gap relative to the first processing layer and increasing the current power level when the at least one identity of the corresponding missing data units relative to the first processing layer is also determined to be a missing data unit relative to the second processing layer The exemplary embodiments further describe a station including a transceiver configured to receive communications from an access network and a processor configured to set a target power for the station by receiving a plurality of data units that include an indication of a position of each data unit within a sequence, determining whether the received plurality of data units include a gap in the sequence, increasing a current power level of the station when a gap in the sequence is determined.

The exemplary embodiments also describe a non-transitory computer readable storage medium with an executable program stored thereon. The program instructs a microprocessor to perform operations comprising receiving data units of a voice application from a network at a current power level set for a station, the data units being in a sequence with a position in the sequence being indicated in each data unit, determining whether a first processing layer of the station detects a gap in the sequence of received data units, communicating an indication from the first processing layer to a second processing layer of the station, the indication indicating at least one identity of corresponding missing data units in the gap relative to the first processing layer and increasing the current power level when the at least one identity of the corresponding missing data units relative to the first processing layer is also determined to be a missing data unit relative to the second processing layer.

The exemplary embodiments may be further understood with reference to the following description and the related appended drawings, wherein like elements are provided with the same reference numerals. The exemplary embodiments are related to a station and method for setting a target power to receive signaling frames from a network associated with a communication functionality between the station and a further station. Specifically, the station may have established a connection with the further station via the network and the signaling frames are used to prepare for transmission of voice data between the stations. The station properly sets the target power by maintaining a current power level or increasing the current power level by a predetermined amount up to a preset maximum based upon information transmitted between a physical layer (PHY) and a radio link control (RLC) of the station.

Figure 1:
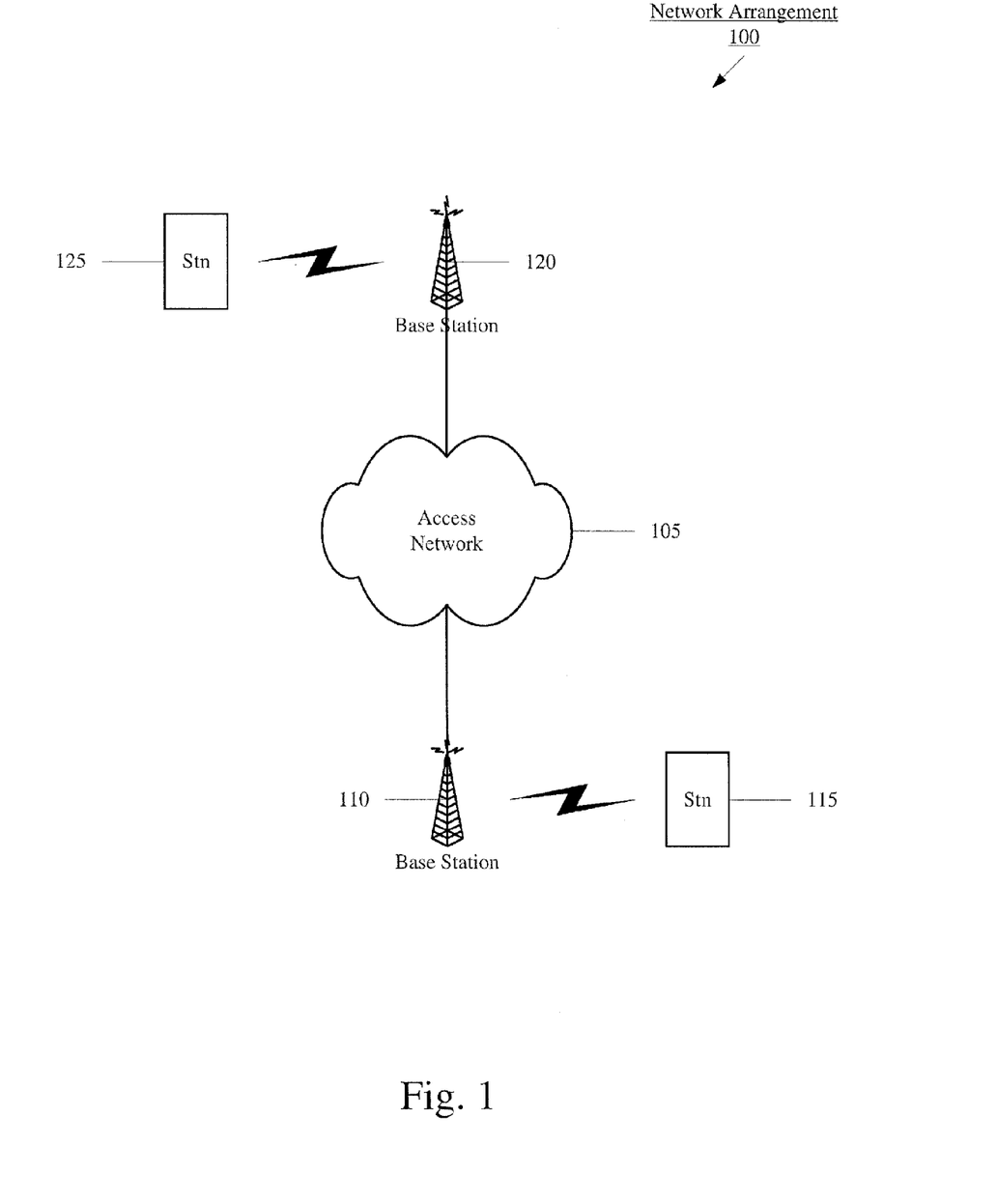
FIG. 1 shows an exemplary simplified network arrangement in which a station performs a communication functionality with a further station.

FIG. 1 shows an exemplary simplified network arrangement 100 in which a first station 115 performs communication functionality with a second station 125. The network arrangement 100 may include an access network 105 that enables the stations 115, 125 to establish a connection therebetween for the communication functionality to be performed. The access network 105 may be any type of network such as a cellular network, a WiFi network, etc. Those skilled in the art will understand that access network may include any number of components that are used to accomplish the communications between devices and the access network 105 may include some or all of these components. The access network 105 may also represent any number of networks that may be interconnected with one another. For example, the access network 105 may include a first network for the station 115 and a second network for the station 125 in which the first network may communicate with the second network. The station 115 may connect to the access network 105 by associating with a base station 110 while the station 125 may connect to the access network 105 by associating with a base station 120. The manner of setting up the communication between the stations 115 and 125 via the access network 105 is not described herein because the communication setup procedures are generally well known and are not critical for the exemplary embodiments. It is sufficient to understand that there are communications that may be received by either of the stations 115 or 125.

In the exemplary embodiments, it will be described that the communication is a WCDMA voice call between the stations 115 and 125. However, it is not required that the WCDMA voice call be between two wireless stations. For example, the voice call may be between the station 115 and a wired device such as a VoIP phone or a phone connected to the PSTN. Those skilled in the art will understand that there are standard manners for the access network 105 to connect to other networks to handle such voice calls. In another example, the communications are not limited to WCDMA or even voice calls. The exemplary embodiments may be applied to any packet-based communications that include at least some packets that do not have bits for checking an order or an integrity of the packets. In the exemplary embodiments, it will be described that some of the packets do not have CRC bits, but again, it is not required that the packets be missing CRC bits, but just that the exact order or integrity of the packets may not be able to be determined.

Figure 2:
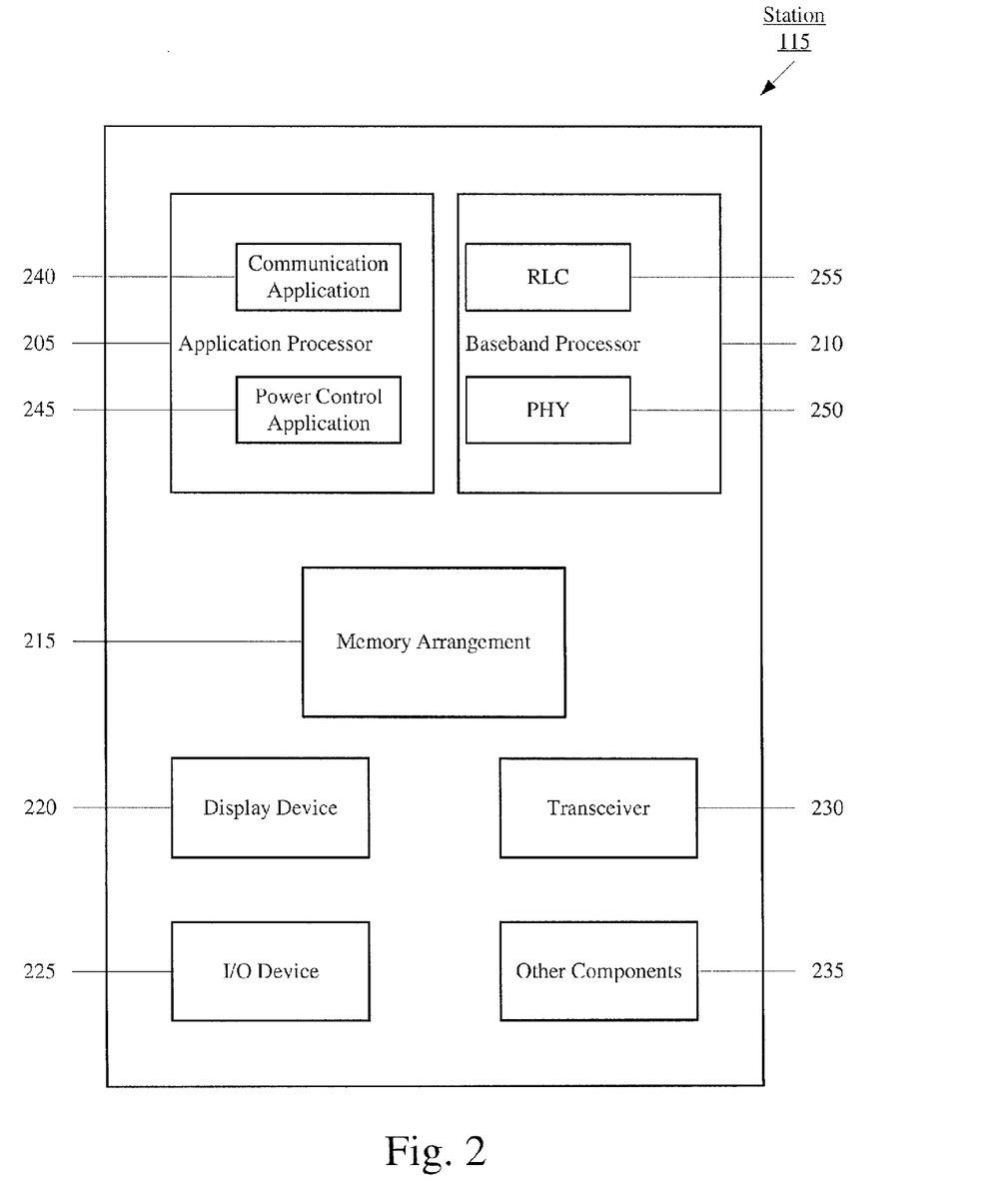
FIG. 2 shows components of an exemplary station configured to set a target power.

FIG. 2 shows components of the station 115 that is configured to set a target power. As will be described in further detail below, the station 115 may use a feedback system to determine how to set the target power. The station 115 may represent any electronic device configured to perform the communication functionality and set the target power. For example, the station 115 may be a portable device (e.g., a cellular phone, a smartphone, a tablet, a phablet, a laptop, etc.) or a stationary device (e.g., desktop terminal). The station 115 may include a processor 205, a baseband processor 210, a memory arrangement 215, a display device 2220, an input/output (I/O) device 225, a transceiver 230, and other components 235 such as a portable power supply, an audio I/O device, etc. The station 125 may also include the components described herein for the station 115.

The processor 205 may be configured to execute a plurality of applications of the station 200. For example, the applications may include a web browser when connected to the access network 105. Similarly, the processor 205 and/or the baseband processor 210, in conjunction with the transceiver 230, may include an association application that establishes a connection between the access network 105 and the station 115. In yet another example, the applications may include a communication application 240 that enables data to be transmitted with the station 125 once a connection has been established therewith. The communication application 240 will be described in further detail below. In a further example and according to the exemplary embodiments, the applications may include a power control application 245. The power control application 245 may provide the feedback system to determine whether an adjustment to the power level being used for the communication application 240 is to be performed. The power control application 240 will be described in further detail below.

It should be noted that the above noted applications each being an application (e.g., a program) executed by the processor 205 is only exemplary. The baseband processor 210 may also execute the applications. In another example, the functionality described herein for the applications 235 and 240 may be included as a separate incorporated component of the station 115 (e.g., an integrated circuit that may or may not execute firmware) or may be a modular component coupled to the station 115.

The memory arrangement 215 may be a hardware component configured to store data related to operations performed by the station 115. For example, the memory arrangement 215 may store information used during transmissions associated with the communication application 240. The memory arrangement 215 may also store settings and adjustment information to be used by the power control application 245. The display device 220 may be a hardware component configured to show data to a user while I/O device 225 may be a hardware component configured to receive inputs from the user and output corresponding data such as a hostname request. The transceiver 230 may enable the station 115 to communicate with the access network 105 as well as with the station 125. As a transceiving unit, the transceiver 230 may include a receiver and a transmitter for the respective functionalities to be performed. The other components 235 may include a portable power supply (e.g., battery), a data acquisition device, ports to electrically connect the remote station 140 to other electronic devices, etc.

The communication application 240 may provide the communication functionality for a user of the station 115. For example, the communication functionality may be a voice call. The voice call entails the station 115 transmitting and receiving voice packets from the station 125. For purposes of the discussion below, the station 115 may represent a recipient of voice packets of the voice call while the station 125 may represent a transmitter of the voice packets. The station 125 and the station 115 may perform the transmission and reception of the voice packets, respectively, in known manners. The station 125 may perform the transmission of the voice packets without requiring preparation information. That is, the station 125 is substantially not required to have information of the access network 105 to transmit the voice packets. In contrast, the station 115 may receive the voice packets only when it is substantially prepared to receive incoming voice packets. Such preparation information to be used by the station 115 for receiving the voice packets may be provided by the transmitter of the transmitting station 125.

When the station 115 receives a data transmission such as voice packets for the voice call, the station 115 may be required to have knowledge of a Transport Format (TF) and its validity for a Transport Channel (TrCH) in a Coded Composite Transport Channel (CCTrCH). Since more than one TrCH may be mapped onto a single physical channel, the station 125 may provide information to the station 115 regarding, for example, a number of transmitted bits of each TrCh in a Transmission Time Interval (TTI) in which a Transport Format Set (TFS) may be a sum of all TFs for one TrCH.

A TF may include a dynamic portion and a semi-static portion. The dynamic portion of the TF may define the Transport Block Size (i.e., a sum of Radio Link Control (RLC) Payload size, a RLC Header, and MAC Header bits) and the Transport Block Set Size (i.e., a number of Transport Blocks that may be delivered in one TTI). The semi-static portion may define the TTI, coding type and rate, size of a CRC (if included), etc. Thus, this information may be passed via the access network 105 so that the station 115 may be "prepared" to receive the voice packets corresponding thereto.

One manner of indicating the type of TF is using a TF Identifier (TFI). The TFI from each TrCH is the Transport Format Combination (TFC). The TFC may identify a number of bits (i.e., Transport Blocks) of each TrCH that are transmitted in an ensuing TTI. The allowed TFCs is the Transport Format Combination Set (TFCS). One manner of indicating the actual TFC to the receiver of the station 115 is to receive a TFC Identifier (TFCI) word that is generated by the station 125 and transmitted to the station 115. The station 115 may decode the TFCI word to receive the TFs for the single TrCH in order to demultiplex the TrCH out of the CCTrCH.

However, there may be instances when the TFCI word is unavailable. When no TFCI word is available, a Blind Transport Format Detection (BTFD) may be performed on the TrCHs within the CCTrCH that have more than one TF and that do not use Single Transport Format Detection (STFD). The BTFD manner requires a variety of different criteria to be performed such as only one CCTrCH being received. When BTFD is used for voice packets, the access network 105 may use a specific type of TF, particularly when the voice call is performed using a Wideband Code Division Multiple Access (WCDMA) standard. Specifically, the TFs 0x148 and 1x148 may be used for signaling. For a multiple transport format case, there are a variety of different data rates that are used including a 0-rate and a full-rate. The 0x148 TF may be a 0-rate TF while the 1x148 TF may be a full-rate TF. The type of data rate may indicate whether a cyclic redundancy check (CRC) is to be used therewith. Specifically, the 0-rate TF may not include a CRC while the full-rate does include the CRC. That is, the 0x148 TF may not include a CRC while the 1x148 TF includes the CRC. At the station 125, the CRC may be generated for voice packets transmitted using the 1x148 TF. As discussed above, the CRC may be included in the semi-static portion of the TF.

Using the above manner, the preparation information may be provided to the station 115. Upon reception of the TF signaling (i.e., 0x148 and 1x148 TFs), the station 115 may initially process the signaling using a physical layer (PHY). With regard to the PHY, the TF signaling may be represented as a Protocol Data Unit (PDU). Those skilled in the art will understand that the PHY may represent a first layer of the Open Systems Interconnection (OSI) Model that standardizes internal functionalities of a communication system. The PHY being the first (or lowest) layer may provide a first processing step for incoming data such as the PDUs. By providing a fundamental layer underlying the other higher layers of the OSI model, the PHY may determine a manner of forwarding PDUs to these higher layers. One particular higher layer is the Data Link Layer that is a second layer of the OSI model. The Data Link Layer may provide a framework for data transfers between network nodes. As such, the Data Link Layer may include a Radio Link Control (RLC) that is responsible for a variety of different functionalities related to the Data Link Layer such as transfer of upper layer PDUs. Although abstract concepts, the PHY and the RLC are represented within the baseband processor 210 of the station 115 in FIG. 2 as PHY 250 and RLC 255, respectively.

Thus, for each PDU received by the station 115, the PHY 250 may perform an initial processing on the PDU. For example, the PHY 250 may determine whether the PDU includes a CRC. As discussed above, when the PDU is a 0x148 TF, there may not be a CRC included therewith whereas when the PDU is a 1x148 TF, there may be a CRC included therewith. When no CRC is included, the PHY 250 may transfer the PDU to the RLC 255 for further processing such as determining a higher layer in which to transfer the PDU. In one particular embodiment, the PHY 250 may automatically transfer the PDU to the RLC 255 when no CRC is found. In contrast, when a CRC is included, the PHY 250 may perform the error check using the CRC. Upon determining that the PDU is properly received, the PHY 250 may then transfer the PDU to the RLC 255. However, if the PHY 250 determines that the PDU is not properly received and/or has errors therein, the PHY 250 may not transfer the PDU to any higher layer including the RLC 255. Instead, the PHY 250 may transmit an indication to the access network 105 for a re-transmission of the PDU including the error. It should be noted that a 0x148 TF may not be passed to the RLC 255 because all the processing that needs to be performed on such a PDU may be performed at the PHY 250 or by other layers that are not the RLC 255.

Prior to receiving the PDUs in the first place, the transceiver 225 must be operated at a particular power level that allows for the PDUs to be received from the access network 105 given the network parameters that may be measured for the time the communication application 240 is used. As discussed above, the memory arrangement 215 may include setting information for the transceiver 225. Thus, upon launching the communication application 240, the network parameters (e.g., received signal strength indicator (RSSI)) may be measured to determine an initial power level to set the transceiver 225 as indicated in the setting information. The initial power level may be a predetermined value that provides an expected probability to receive any (and all) incoming PDUs. When different network parameters are measured while the communication application 240 is used, the power control application 240 may adjust the power level using known manners. However, outside this power control mechanism, at least one PDU may still be missed and not received by the station 115. The RLC 255 may be capable of determining whether there is a gap in the received PDUs since the PDUs used in a WCDMA voice call having voice frames configured with BTFD are sequentially numbered and indicated therein (e.g., provided in the semi-static portion of the TF). When such a gap in PDUs is detected, the RLC 255 may be incapable of determining whether the gap is due to a missed transmission, whether this missed transmission is known by the PHY 250, whether the missed PDU relative to the RLC 255 is not required by the RLC 255 but used by the PHY 250 (e.g., DRX/DTX used in Discontinuous Reception), etc.

According to the exemplary embodiments, the RLC 255 may communicate a feedback indication to the PHY 250 to improve reception of PDUs based upon actual missed transmissions. That is, the feedback indication from the RLC 255 may indicate a number of missed transmissions that enable the power control application 240 to adjust the target power to be used for subsequent receptions of PDUs. The target power may be adjusted based upon information known to the PHY 250 and the feedback indication provided by the RLC 255. As will be described in further detail below, the information known to the PHY 250 may relate to PDUs that have been received by the station 115, particularly at the PHY 250, but not transferred to the RLC 255.

The feedback indication communicated by the RLC 255 may relate to any gap that is detected by the RLC 255 based upon the sequence numbering of the PDUs that the RLC 255 has received. When the feedback indication only indicates that the gap in PDUs coincides with known PDUs that have been received but not transferred, the PHY 250 may determine to maintain the current power level. In contrast, when the station 115 does not receive a PDU, the PHY 250 may be unaware of this missing PDU. Thus, when the feedback indication includes a gap including at least one PDU that is not known by the PHY 250, the PHY 250 may provide an adjustment signal to the power control application 240 to adjust the target power of the transceiver 225. The adjustment signal may be generated based upon the setting information in which the power level is powered up based upon various criteria. For example, the power level may be increased in an incremental manner for each missing PDU. In one example, for N missing PDUs, the power level may be increased by a product of N and a predetermined amount such as 0.5-1.0 dB. In another example, the power level may be increased in a dynamic manner that incorporates the number of missing PDUs. The station 115 may also utilize measured network parameters and the feedback information to determine the adjustment to the target power. Various different scenarios may exist that incorporate the above manner of adjusting the target power in which several are described below with regard to FIGS. 3A-B.

The initial power level and the amount of adjustment for the power level may be based upon any power value. That is, the power value may be any form known to those skilled in the art. For example, the power level may be measured in terms of a Signal-to-Interference Ratio (SIR) Threshold (SIRT). Those skilled in the art will understand that any other power level may be used such as dB, Signal-to-Noise Ratio (SNR), etc.

Figure 3A:
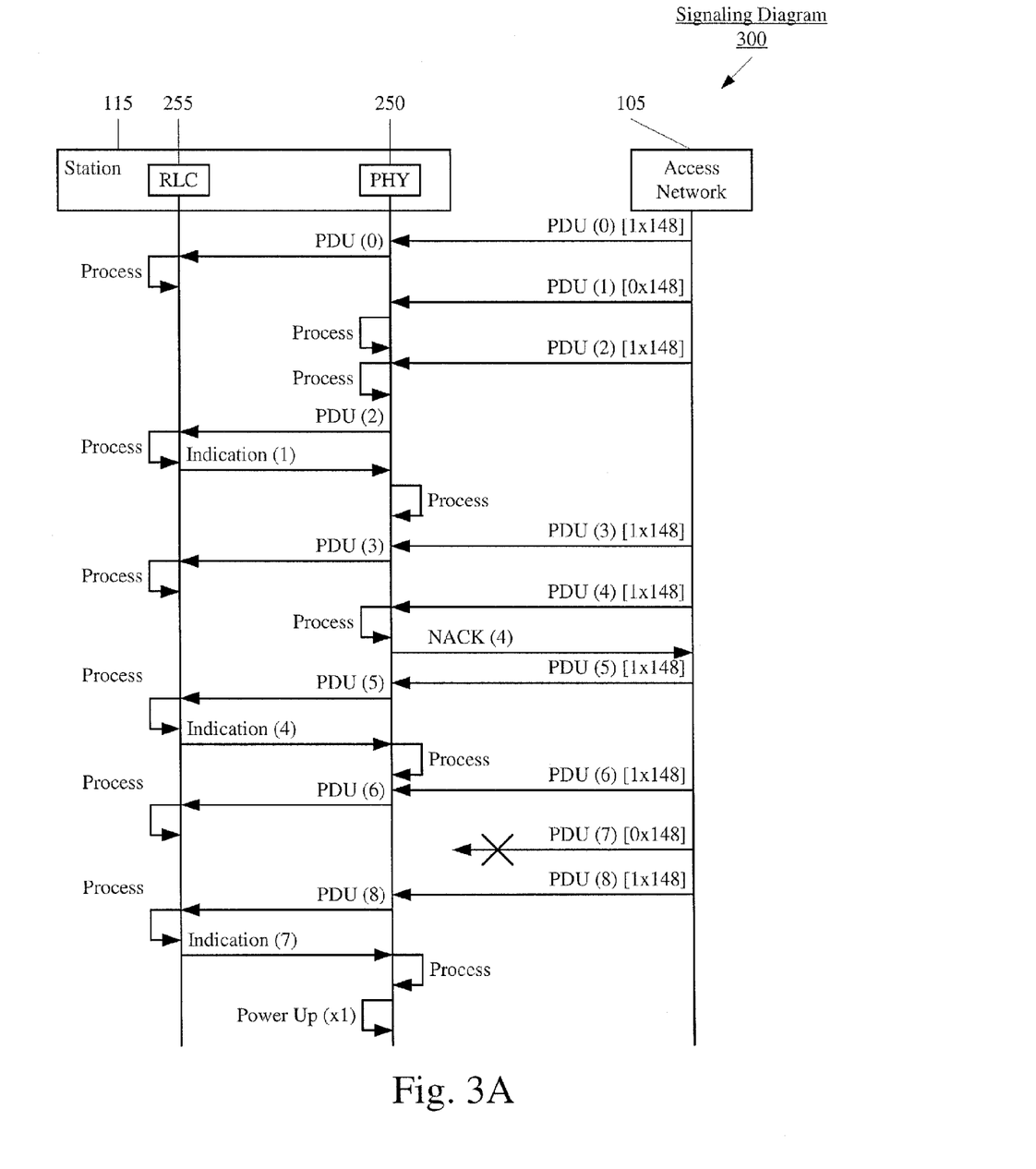
FIG. 3A shows a first exemplary signaling diagram for setting a target power for a first set of signaling frames.
Figure 3B:
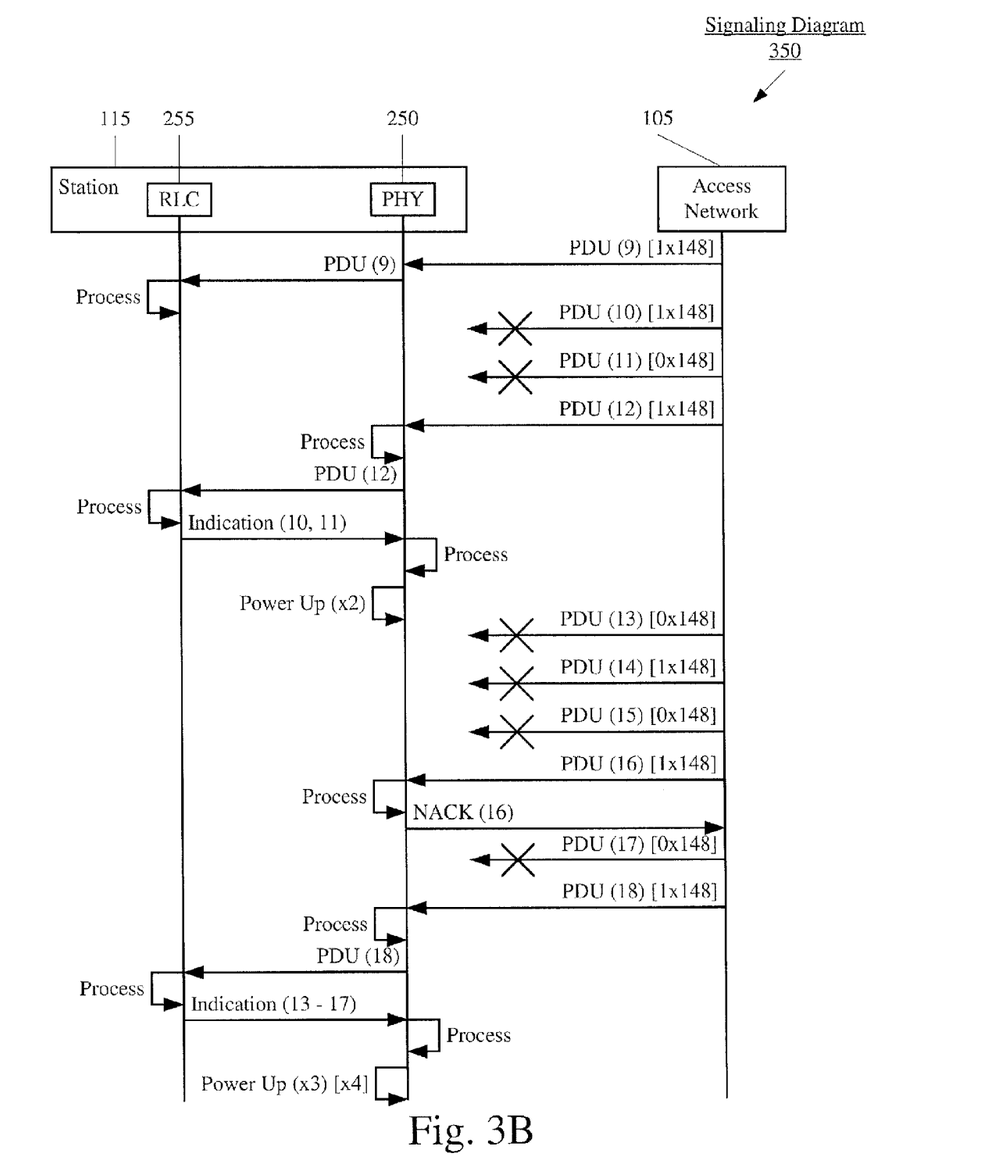
FIG. 3B shows a second exemplary signaling diagram for setting a target power for a second set of signaling frames.

FIG. 3A shows a first exemplary signaling diagram 300 and FIG. 3B shows a second exemplary signaling diagram 350 for setting a target power for a first set and a second set of signaling frames, respectively. Specifically, the signaling diagrams 300, 350 may represent a process of receiving PDUs and setting a target power based upon the feedback information of the RLC 240. Thus, the signaling diagram 300 may be a beginning portion of the process while the signaling diagram 350 may be a continuation thereof. As illustrated, the signaling diagrams 300, 350 may illustrate an interaction between the access network 105 and the station 115 as well as with the PHY 250 and the RLC 255. Thus, the signaling diagrams 300, 350 may relate to using the communication application 240 and further using the power control application 245 while the communication application 240 is in use. It may be assumed that the station 115 has established a connection with the access network 105 and has also established a connection with the station 125 to perform the communication application 240. That is, all prior processes required for the PDUs to be received by the station 115 may be assumed to have been properly performed.

As discussed above, the PDUs may be transmitted from the access network 105 via the base station 110 to the station 115 in a sequential manner in which each PDU may also include a respective numbering within the sequence. In the signaling diagram 300 the communications are shown as being between the access network 105 and the station 115. It should be understood that the direct communications are between the base station 110 (which may be considered a component of the access network 105) and the station 115. Thus, the functionality that is described for the access network 105 herein may reside (wholly or partially) within the base station 110.

In another example, the functionality that is described for the access network 105 may reside (wholly or partially) within core network components of the access network 105.

The signaling diagram 300 begins with a PDU (0), which is a 1x148 TF. The PDU (0) may be received by the station 115 in which the PHY 250 performs the initial processing for the PDU. For example, as discussed above, the PHY 250 may determine whether the PDU (0) has a CRC included to determine whether the PDU (0) has been properly received. The 1x148 TF PDU may include a CRC. Thus, the PDU (0) may be processed by the PHY 250 to determine whether the PDU (0) has been properly received from the access network 105. As illustrated in the signaling diagram 300, the PDU (0) may have been properly received based upon using the CRC such that the PDU (0) is transferred to the RLC 255. It should be noted that the PHY 250 may transfer the PDU including the CRC when the error check has been passed and the PDU has been properly received. Since the PDUs in the signaling diagrams 300, 350 relate to voice packets used in the communication application 240, the PDUs that need to be transferred to higher layers may be transferred from the PHY 250 to the RLC 255. Accordingly, the PDU (0) is transferred from the PHY 250 to the RLC 255 for further processing. Upon receiving the PDU (0), the RLC 255 may store (e.g., in the memory arrangement 215) the sequence of PDUs being received.

However, such a transfer process is only exemplary and the PHY 250 may nonetheless be capable of transferring a PDU that fails the error check using the CRC. In such a scenario, various further steps may be performed by the PHY 250 such as indicating to the RLC 255 that the PDU that is being transferred failed the error check, requesting a re-transmission of the PDU from the access network 105 by transmitting a negative acknowledgement (NACK), etc. For illustrative purposes, the process described in the signaling diagrams 300, 350 uses the transfer process in which the PDU including the CRC must pass the error check. It should also be noted that there may be additional signaling between the station 115 and the access network 105 that is not shown in the signaling diagram 300. For example, the PHY 250 may send an acknowledgement (ACK) when it is determined that the PDU has been received correctly.

In a next step, the station 115 receives a PDU (1) that is a 0x148 TF from the access network 105. As described above, 0x148 TF PDUs typically do not include CRCs. If no CRC is included as is the case with 0x148 TF PDUs, the PHY 250 may process the PDU (1) without performing the CRC. However, 0x148 TF PDUs may also not need to be transferred to a higher layer for processing. Thus, the processing performed by the PHY 250 on PDU (1) completes the transaction with respect to this PDU (1) for the station 115. It should be noted that in this case, since the PDU (1) has not been transferred to the RLC 255, this will create a gap in the sequence with respect to PDUs received by the RLC 255. The treatment of this gap will be discussed in greater detail below.

The station 115 may then receive a PDU (2) that is a 1x148 TF from the access network 105. The processing of the PDU (2) is substantially similar to the processing described above for the PDU (0). The 1x148 TF PDU (2) may include a CRC and, thus, the PDU (2) may be processed by the PHY 250 to determine whether the PDU (2) has been properly received from the access network 105. As illustrated in the signaling diagram 300, the PDU (2) may have been properly received based upon using the CRC such that the PDU (2) is transferred to the RLC 255 for further processing. However, in this instance, upon the further processing of the PDU (2), the RLC 255 may be aware that there is a gap in the sequence of PDUs. Specifically, the immediately previous PDU relative to the PDU (2) is the PDU (0). As discussed above, the PDU (1) was not transferred to the RLC 255 because it was not a PDU that was required to be transferred to the RLC 255. According to the exemplary embodiments, the RLC 255 may use the feedback system to communicate a feedback indication (1) to the PHY 250 that the PDU (1) has not been received. The PHY 250 may process the feedback indication (1) and determine whether this "missed" PDU relative to the RLC 255 is also a missed transmission relative to the PHY 250. Specifically, the PHY 250 may determine the status of this PDU using its own knowledge of received PDUs from the access network 105. As discussed above, the PDU (1) was received and processed by the PHY 250. Thus, the PHY 250 is aware that this PDU (1) has been received and processed at the PPHY 250. Since the PDU (1) indicated in the feedback indication coincides with a known, received PDU relative to the PHY 250, the station 115 may maintain the current power level of the target power used for the transceiver 225. That is, the transceiver 225 is operating at a sufficient power level to receive the PDUs. Thus, no increase in power is required.

The station 115 may then receives a PDU (3) that is a 1x148 TF from the access network 105. The PDU (3) may be processed and transferred to the RLC 255 for further processing using a substantially similar manner as discussed above with regard to PDU (0) and PDU (2). Subsequently, a PDU (4) that is a 1x148 TF may then be received by the station 115 from the access network 105. Since the PDU (4) is a 1x148 TF including a CRC, the PHY 250 check the integrity of the PDU (4) based on the CRC. However, as illustrated in the signaling diagram 300, the PHY 250 may determine that the PDU (4) fails the error check. Thus, the PDU (4) may not be transferred to the RLC 255. Instead, the PHY 250 may transmit a NACK (4) for the PDU (4) to the access network 105. The NACK (4) may indicate that the PDU (4) is to be re-transmitted. Thus, in this example, the PHY 250 has knowledge of the PDU (4) that has been received but in an improper way.

The station 115 may then receive a PDU (5) that is a 1x148 TF from the access network 105. The PDU (5) may be processed by the PHY 250 and transferred to the RLC 255 for further processing. However, in this instance, upon the further processing of the PDU (5), the RLC 255 may be aware that there is a gap in the sequence of PDUs. Specifically, the immediately previous PDU relative to the PDU (5) is the PDU (3). As discussed above, the PDU (4) was not transferred to the RLC 255 due to the failure of the error check. According to the exemplary embodiments, the RLC 255 may use the feedback system to communicate a feedback indication (4) to the PHY 250 that the PDU (4) has not been received. The PHY 250 may process the feedback indication (4) and determine whether this "missed" PDU relative to the RLC 255 is also a missed transmission relative to the PHY 250. Specifically, the PHY 250 may determine the status of this PDU using its own knowledge of received PDUs from the access network 105. As discussed above, the PDU (4) may have failed the error check using the CRC. Thus, the PDU (4) was not transferred from the PHY 250 to the RLC 255. The PHY 250 is also aware that this PDU (4) has been received, although improperly (e.g., with errors). Since the PDU (4) indicated in the feedback indication coincides with a known, received PDU relative to the PHY 250, the station 115 may maintain the current power level of the target power used for the transceiver 225. That is, the transceiver 225 is operating at a sufficient power level to receive the PDUs. Thus, no increase in power is required.

The station 115 may then receive a PDU (6) that is a 1x148 TF from the access network 105. The PDU (6) may be processed by the PHY 250 and transferred to the RLC 255 for further processing. A PDU (7) that is a 0x148 TF may then be transmitted from the access network 105. However, as shown in the signaling diagram 300, the PDU (7) may not be received by the station 115, specifically by the PHY 250. For example, various network conditions may have altered since the previous PDUs were received that may require a higher power level to be used for the target power of the transceiver 225. Although not received, the access network 105 may continue to transmit the next PDU in the sequence until indicated otherwise (e.g., the NACK from the PHY 250).

The station 115 may then receive a PDU (8) that is a 1x148 TF from the access network 105. The PDU (8) may be processed by the PHY 250 and transferred to the RLC 255 for further processing. However, in this instance (much like the PDU (5)), upon the further processing of the PDU (8), the RLC 255 may be aware that there is a gap in the sequence of PDUs. Specifically, the immediately previous PDU relative to the PDU (8) is the PDU (6). As discussed above, the PDU (7) was not received by the PHY 250. Thus, according to the exemplary embodiments, the RLC 255 may use the feedback system to communicate a feedback indication (7) to the PHY 250 that the PDU (7) has not been received. The PHY 250 may process the feedback indication (7) and determine that this "missed" PDU relative to the RLC 255 is also a missed transmission relative to the PHY 250. In this case, the PDU (7) is a missed transmission to both the RLC 255 and the PHY 250. At this point, the PHY 250 also has knowledge of the PDU (7). Since the PDU (7) is a missed PDU relative also to the PHY 250, the station 115 may increase the power level of the target power used by the transceiver 225. Specifically, the PHY 250 may transmit a signal to the power control application 245 to increase the power level based upon an indication in the signal. As discussed above, the increase may be performed incrementally based upon a product of N missing PDUs and a predetermined incremental value V. Thus, since only a single PDU (7) is detected to be a missed transmission thereby N being 1, the power increase may be 1×V. Accordingly, the new power level may be a sum of the current power level and the power increase.

As discussed above, the memory arrangement 215 may store setting information for the power control application 245. The setting information may include a predetermined maximum power level that is not to be exceeded. Thus, the power control application 245 may perform a check to determine whether the new power level exceeds the predetermined maximum power level. If the new power level is less than the predetermined maximum power level, the power control application 245 may set the target power of the transceiver 225 to the new power level. However, if the new power level is greater than or equal to the predetermined maximum power level, the power control application 245 may set the target power of the transceiver 225 to the predetermined maximum power level.

Continuing to the signaling diagram 350 that is illustrated in FIG. 3B, a PDU (9) that is a 1x148 TF may then be received by the station 115 from the access network 105. The PDU (9) may be received using the target power being set to the new power level from the process that occurred due to receiving the PDU (8). The PDU (9) may be processed by the PHY 250 and transferred to the RLC 255 for further processing. A PDU (10) that is a 1x148 TF and a PDU (11) that is a 0x148 TF may then be transmitted from the access network 105. However, as shown in the signaling diagram 350, the PDU (10) and the PDU (11) may not be received by the station 115, specifically by the PHY 250. Subsequently, a PDU (12) that is a 1x148 TF may be received by the station 115 from the access network 105. The PHY 250 may process the PDU (12) and determine that it passes the error check based upon the CRC included therein and transfers the PDU (12) to the RLC 255. The RLC 255 may further process the PDU (12). In a substantially similar manner discussed above, the RLC 255 may communicate a feedback indication (10, 11) to the PHY 250 indicating that there is a gap and that this gap includes two missing PDUs in the sequence since the immediately prior received PDU relative to the PDU (12) is the PDU (9). The PHY 250 may process the feedback indication (10, 11) in a substantially similar manner as discussed above. However, with two missing PDUs that are detected, the increase in power level may be 2×V. Thus, the current power level may be increased by 2×V to set a new power level.

It should be noted that this effect may be cumulative. That is, the power level used for the PDUs (0)-(8) may have been an initial power level $V_i$ that was set as indicated in the setting information. After receiving the PDU (8), the power level was increased by 1×V. Thus, the new power level after receiving the PDU (8) is set to be $(V_i+1\times V)$. From the PDU (9), the current power level is now $(V_i+1\times V)$. However, after receiving the PDU (12), the power level was increased by 2×V. Thus, the new power level after receiving the PDU (12) is set to be $(V_i+1\times V+2\times V)$.

Returning to the signaling diagram 350, a PDU (13) that is a 0x148 TF, a PDU (14) that is a 1x148 TF, and a PDU (15) that is a 0x148 TF may then be transmitted from the access network 105. However, as shown in the signaling diagram 350, the PDU (13), the PDU (14), and the PDU (15) may not be received by the station 115, specifically by the PHY 250. Subsequently, a PDU (16) that is a 1x148 TF may be received by the station 115 from the access network 105. As illustrated in the signaling diagram 350, the PHY 250 may determine that the PDU (16) fails the error check. Thus, the PDU (16) may not be transferred to the RLC 255. Instead, the PHY 250 may transmit a NACK (16) for the PDU (16) to the access network 105. The NACK (16) may indicate that the PDU (16) is to be re-transmitted. A PDU (17) that is a 0x148 TF may then be transmitted from the access network 105. However, as shown in the signaling diagram 350, the PDU (17) may not be received by the station 115, specifically by the PHY 250. Subsequently, a PDU (18) that is a 1x148 TF may be received by the station 115 from the access network 105.

The PHY 250 may process the PDU (18) and determine that it passes the error check based upon the CRC included therein and transfers the PDU (18) to the RLC 255. The RLC 255 may further process the PDU (18). In a substantially similar manner discussed above, the RLC 255 may communicate a feedback indication (13-17) to the PHY 250 indicating that there is a gap and that this gap includes six missing PDUs in the sequence since the immediately prior received PDU relative to the PDU (18) is the PDU (12). The PHY 250 may process the feedback indication (13-17) in a substantially similar manner as discussed above. In this scenario, the PHY 250 may determine that the PDU (13), the PDU (14), the PDU (15), and the PDU (17) are all missing PDUs relative to both the RLC 255 and the PHY 250. However, the PDU (16) may coincide with a known, received PDU relative to the PHY 250. In this case, the PHY 250 may transmit a signal to the power control application 245 to increase the target power of the transceiver 225. This increase in power level may be provided in a variety of manners due to the existence of a known, received PDU within the missing PDUs. In a first example, the power level may be increased based upon a total number of missing PDUs within the indicated gap. Since there are four missing PDUs in this gap (i.e., PDUs (13)-(15) and PDU (17)), the current power level may be increased by 4×V to set a new power level. In a second example, the power level may be increased based upon a total number of consecutive missing PDUs within the indicated gap. Since there are missing PDUs in this gap include three missing PDUs that are consecutive, the current power level may be increased by 3×V to set a new power level.

It should be noted that the above manner of communicating the feedback indication from the RLC 255 to the PHY 250 is only exemplary. Specifically, the above manner of communicating the feedback indication is immediately after the RLC 255 detects that there is a missing PDU in the sequence. However, the exemplary embodiments may also be modified such that the feedback indication is communicated under various different circumstances. For example, the feedback indication may be communicated after a particular time period. Upon the time period lapsing, the RLC 255 may provide the feedback indication that indicates whether there is a missing PDU and if so, how many. In another example, the feedback indication may be communicated after a particular number of PDUs have been received by the RLC 255. Thus, after receiving this number of PDUs, the RLC 255 may communicate the feedback indication that indicates whether there is a missing PDU and if so, how many.

It should also be noted that the above-described manner of adjusting the target power may also incorporate a powering down process using known manners. For example, upon detecting measured network parameters that enable a lesser power level to be used from a current power level, the power control application 245 may adjust the target power by decreasing the power level. For example, the station 115 may transition from the base station 110 to another base station from which the station 115 receives a stronger signal. The power control application 245 may be informed of this transition or may receive indications of the stronger signal and may decrease the power of the transceiver 230 back to an initial setting or in steps as PDUs are successfully received. In another example, the power control application 245 may consider a limited power supply that the station 115 uses. If the limited power supply reaches a predetermined threshold capacity, the power control application 245 may adjust the target power by decreasing the power level after a predetermined time period of using the increased power level.

Figure 4:
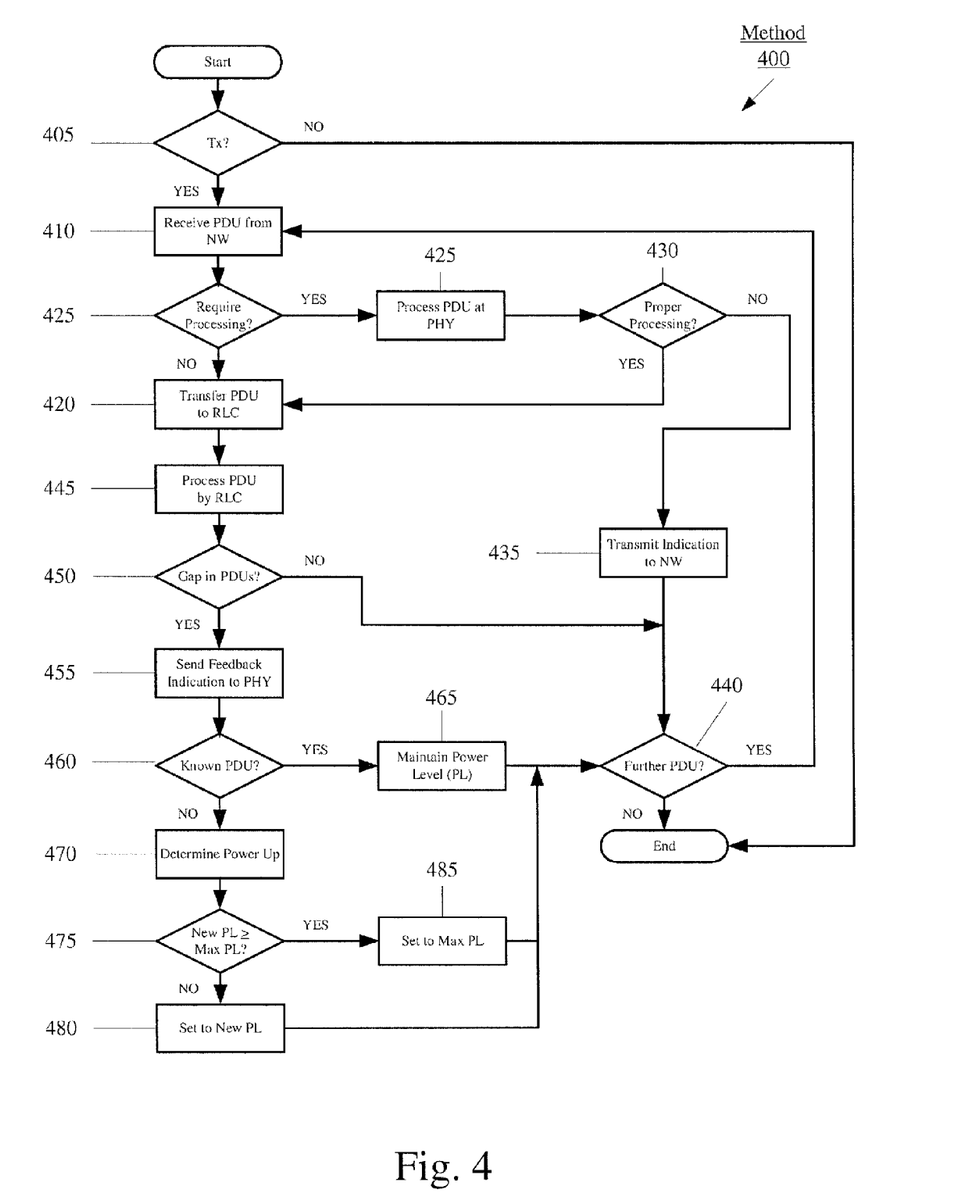
FIG. 4 shows an exemplary method for setting a target power.

FIG. 4 shows an exemplary method 400 for setting a target power. The method 400 relates to using the feedback system discussed above in which the RLC 255 communicates a feedback indication to the PHY 250 to determine a degree of increasing a power level of a target power used for the transceiver 225 of the station 115. The method 400 will be described with regard to the station 115 and a manner in which the communication application 240 and the power control application 245 are used to set the target power. The method 400 will be described with regard to the network arrangement 100 of FIG. 1, the components of the station 115 of FIG. 2, and the signaling diagrams 300, 350 of FIGS. 3A, 3B, respectively.

In step 405, the station 115 may determine whether there is an incoming transmission. As discussed above, the station 115 may be configured to perform a voice call using WCDMA in which signaling from the access network 105 uses TFs 0x148 and 1x148 when voice packets are configured with BTFD. If there is no incoming transmission, the station 115 may end the method 400. If there is an incoming transmission, the station 115 continues the method 400 to step 410.

In step 410, the station 115 receives a PDU from the access network 105. Specifically, the PHY 250 functionality of the baseband processor 210 for the station 115 receives the PDU. As discussed above in the signaling diagram 300 of FIG. 3A, a first PDU that is received may be a PDU (0). However, the method 400 may be used for each PDU that is received by the station 115. In step 415, the PHY 250 decodes the PDU to determine whether further processing is required by the PHY 250. For example, the PDU may include a CRC for an error check to be performed by the PHY 250 (e.g., when the PDU is a 1x148 TF). If no further processing is required by the PHY 250, the method 400 continues to step 420. However, if further processing is required such as performing the error check, the method 400 continues to step 425 where the PDU is processed.

In step 430, the PHY 250 determines whether the PDU has been properly received. For example, the PHY 250 determines whether the PDU has been properly received by performing the error check using the CRC included in the PDU. If the PDU has been properly received, the method 400 continues to step 420. If the PDU has not been properly received, the method 400 continues to step 435 where an indication (e.g., a NACK) is transmitted from the station 115 to the access network 105. The NACK may indicate the PDU that was improperly received such that the access network 105 may re-transmit this improperly received PDU. For example, the PDU (4) of the signaling diagram 300 of FIG. 3A was determined to be improperly received. The station 115 may transmit the NACK to the base station 110 indicating the PDU (4) was not received correctly and the base station 110 may re-transmit the PDU (4) to the station 115. It should be noted that the receipt of the retransmission of the PDU (4) may be out of order, e.g., not received between PDU (3) and PDU (5). However, the RLC 255, having received the PDU (3) and PDU (5) will understand that there is not a gap when the retransmission of PDU (4) is received.

In step 440, the station 115 determines whether there are any further received PDUs. If there are no further PDUs, the station 115 may end the method 400. However, when there are further PDUs, the station 115 may return the method 400 to step 410 to receive the next PDU from the access network 105.

The step 420 of method 400 is reached when the PHY 250 determines that the PDU does not require further processing (e.g. PDU (0) of FIG. 3A as determined in step 415) or when the PHY 250 has determined that the PDU has been properly received by the PHY 250 (e.g., PDU (2) of FIG. 3A as determined in step 430). In step 420, the PHY 250 may determine a higher layer in which the PDU is to be transferred. For example, the PHY 250 may determine that the PDUs that are received are to be transferred to the second layer including the RLC 255. Thus, in step 420, the PDU is transferred from the PHY 250 to the RLC 255.

In step 445, the PDU is further processed at the RLC 255. For example, part of this processing may be to determine the sequence information of the PDU. In step 450 it is determined by the RLC 455 if there is a gap in the received PDUs. Referring back to FIG. 3A, the RLC 455 will determine that there is no gap upon the receipt of, for example, PDUs (1)-(3). In this case, the method 400 may continue to step 440 to determine if there are any additional PDUs that need to be processed. It should be noted that this does not mean that the processing of an individual PDU is completed. Rather, there may be many more processing steps that are performed by the baseband processor 210 and/or the applications processor 205 on the received PDU. However, for the purposes of the exemplary embodiment of adaptive power control for the transceiver 230, no additional information is needed from the received PDU.

On the other hand, if in step 450 the RLC 255 determines there is a gap in the received PDUs, the RLC 255, in step 455, will communicate a feedback indication to the PHY 250 indicating the gap. Referring back to FIG. 3A, the RLC 255 will determine that there is a gap upon the receipt of, for example, PDU (5) because PDU (4) is missing and PDU (8) because PDU (7) is missing. As described above, the RLC 455 does not know what caused the gap. In the example of missing PDU (4), the PDU (4) was received, but it was not received correctly because the CRC check failed. In the example of PDU (7), the PDU (7) was never received by the transceiver 230 of the station 115. As discussed above, the feedback indication sent from the RLC 255 to the PHY 250 may include an indication of the gap and the identification of the missing PDUs in the gap. In the example of missing PDUs (4) and (7) of FIG. 3A, there is only one missing PDU. In the example of missing PDUs (13)-(17) of FIG. 3B, there are five (5) missing PDUs.

In step 460, the PHY 250 determines whether the missing PDUs indicated in the feedback indication are known as missing to the PHY 250. In the first example and as discussed above in the signaling diagram 300 of FIG. 3A, the gap detected by the RLC 255 from received PDU (3) and received PDU (5) for PDU (4) is known by the PHY 250 because the PHY 250 attempted to process this PDU (4), but had to send a NACK (4) to the access network 205 because the PDU (4) was received incorrectly. If the PHY 250 determines the missing PDU, as identified by the RLC 255, is known by the PHY 250 such as the PDU (4), the method 400 continues to step 465 where the power level of the target power used by the transceiver 230 as set by the power control application 245 is maintained. As described above, there is no need to increase the power level because the station 115 received the PDU (4), it was just that the gap was created (relative to the RLC 255) because the PDU (4) was corrupted as indicated by the CRC check. Subsequently, the method 400 continues to step 440 to determine whether there are any further PDUs.

In a second example as discussed above in which the missing PDU indicated in the feedback indication sent by the RLC 255 is PDU (7), the PHY 250 may determine in step 460 that the PDU (7) is not known by the PHY 250 because it was never received. Since the PDU (7) was never received, the station 115 will increase the power of the transceiver 230 to increase the chances that PDUs will not be missed. In step 470, the station 115 may determine an amount of power up for each missing PDU. As described above, in one example, the power increase may be a step value (V) for each missing PDU. In this particular example, the power increase may be 1×V since one PDU (7) is missing. However, in the example of FIG. 3B where PDUs (10)-(11) are detected to be missing by both the RLC 255 and the PHY 250, the increase in power may be two step values (e.g., 2×V).

However, before implementing the power increase, the station 115, in step 475, may determine whether the proposed power increase applied to a current power level results in a new power level that is beyond a predetermined maximum power level. If the new power level is less than the predetermined maximum power level, the method 400 continues to step 480 in which the new power level is set for the target power of the transceiver 230. However, if the new power level is greater than or equal to the predetermined maximum power level, the method 400 continues to step 485 in which the predetermined maximum power level is set for the target power of the transceiver 230. Subsequent to steps 480 or 485, the method 400 to step 440 to determine whether there are any further PDUs.

It should be noted that the method 400 may be modified in a variety of manners. For example, to address each scenario discussed above in the signaling diagrams 300, 350, the method 400 may be modified to include steps that address when a group of PDUs determined to be missing by the RLC 255 only includes a subset of missing PDUs relative to the PHY 250. Specifically, this may be for the PDUs (12)-(18) in the signaling diagram 350 of FIG. 3B.

The exemplary embodiments provide a station and method for setting a target power for a transceiver to receive data from a network based upon a feedback indication communicated by a radio link control to a physical layer of a processor of a receiving station. Based upon knowledge of the physical layer and the information included in the feedback indication, a determination of whether a current power level requires adjustment, namely an increase in power level, due to a missing unit of data. If the feedback indication includes a data unit that is known to the physical layer, this data unit has already been received by the station 115 such that a change in the current power level is not required. However, if the feedback indication includes at least one data unit that is unknown to the physical layer, the at least one data unit has not been received by the station 115 and an increase in the current power level may be required. Thus, the current power level may be increased in an incremental manner using a predetermined incremental value for each missing data unit.

Those skilled in the art will appreciate that the exemplary embodiments may apply to any acknowledgement mode transmission scheme where a CRC is not included for processing at the PHY 250 for a particular transmission. That is, the exemplary embodiments may be used with any transmission scheme where a transfer is performed from a first processing unit to a second processing unit in which the second processing unit communicates a feedback indication to the first processing unit to determine a manner of setting a target power based upon information known to the first processing unit and the feedback indication. For example, the transmission scheme may be a Hybrid Automatic Repeat Request (HARQ) in which the exemplary embodiments may be used therewith.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, mobile device including operating systems such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
   at a station that includes circuitry that implements a first processing layer and a second processing layer, wherein the first processing layer is a radio link control (RLC) layer and the second processing layer is a physical layer:
      receiving data units of a voice application from a network at a current power level set for the station, the data units being in a sequence with a position in the sequence being indicated in each data unit;
      determining whether the first processing layer of the station detects a gap in the sequence of received data units;
      communicating an indication from the first processing layer to the second processing layer, the indication indicating at least one identity of corresponding missing data units in the gap relative to the first processing layer; and
      increasing the current power level when the at least one identity of the corresponding missing data units relative to the first processing layer is also determined to be a missing data unit relative to the second processing layer.

2. The method of claim 1, wherein the data units are first received by the second processing layer that transfers a portion of the data units to the first processing layer.

3. The method of claim 1, wherein an amount of the increase to the current power level is based on a number of missing data units relative to the first and second processing layer.

4. The method of claim 1, wherein the second processing layer determines that one of the at least one identity of the corresponding missing data units relative to the first processing layer is not a missing data unit relative to the second processing layer.

5. The method of claim 1, wherein the current power level is prevented from increasing beyond a predetermined maximum power level.

6. The method of claim 5, wherein the current power level is increased to the predetermined maximum power level when the predetermined maximum power level becomes determined to be exceeded.

7. The method of claim 1, wherein the current power level is increased incrementally based upon a predetermined incremental value and a number of missing data units relative to the second processing layer.

8. The method of claim 7, wherein the predetermined incremental value is between 0.5 and 1.0 dB.

9. The method of claim 7, wherein the current power level is increased incrementally further based upon a consecutive number of missing data units relative to the second processing layer.

10. The method of claim 1, wherein the voice application is a Wideband Code Division Multiple Access (WCDMA) voice call, the data units are signals using a transport format of 0x148 and 1x148 for voice frames configured with Blind Transport Format Detection (BTFD).

11. A station, comprising:
   a transceiver configured to receive communications from an access network; and
   a processor configured to set a target power for the station by:
      receiving a plurality of data units that include an indication of a position of each data unit within a sequence;
      determining whether the received plurality of data units include a gap in the sequence, wherein whether the received plurality of data units include the gap is determined by:
         decoding the plurality data units at a first networking processing layer;
         determining an identity of missing data units in the gaps; and
         communicating an indication to a second networking processing layer, wherein the indication includes the identity of the missing data units; and
      increasing a current power level of the station when a gap in the sequence is determined.

12. The station of claim 11, wherein increasing the current power level by the processor includes:
   determining a new power level of the station; and
   increasing the current power level to the new power level when the new power level is less than or equal to a predetermined maximum power level of the station and increasing the current power level to the predetermined maximum power level when the new power level is greater than the predetermined maximum power level of the station.

13. The station of claim 11, wherein increasing the current power level by the processor includes:
   determining a new power level of the station as a function of one of a predetermined step value increase in power or a number of data units in the gap in the sequence.

14. The station of claim 11, wherein the processor determines whether the received plurality of data units include the gap by:
   determining whether the second networking processing layer has received the data units identified in the indication, wherein the gap is determined when the second networking processing layer has not received the data units.

15. The station of claim 14, wherein the second networking processing layer has determined the data units identified in the indication have been received in a corrupted state.

16. The station of claim 11, wherein the processor is configured to set a target power for the station by:
   forwarding the data units from the second networking processing layer to the first networking processing layer, wherein the second networking processing layer processes a first portion of the data units prior to forwarding the data units and forwards a second portion of the data units without processing.

17. The station of claim 11, wherein the data units are Protocol Data Units (PDUs) of a Wideband Code Division Multiple Access (WCDMA) voice call.

18. A non-transitory computer readable storage medium with an executable program stored thereon, wherein the program instructs a microprocessor to perform operations comprising:
   receiving data units of a voice application from a network at a current power level set for a station, the data units being in a sequence with a position in the sequence being indicated in each data unit;
   determining whether a first processing layer of the station detects a gap in the sequence of received data units;
   communicating an indication from the first processing layer to a second processing layer of the station, the indication indicating at least one identity of corresponding missing data units in the gap relative to the first processing layer; and
   increasing the current power level when the at least one identity of the corresponding missing data units relative to the first processing layer is also determined to be a missing data unit relative to the second processing layer.

19. The non-transitory computer readable storage medium of claim 18, wherein the first processing layer is a radio link control layer and the second processing layer is a physical layer.

* * * * *